United States Patent [19]

Tsuge et al.

[11] 4,237,690
[45] Dec. 9, 1980

[54] PISTON RETURN STOP DEVICE FOR SEAT BELT TENSIONING DEVICE

[75] Inventors: Noboru Tsuge, Kariya; Satosi Kuwakado, Aichi; Toshihiro Takei; Toshiaki Shimogawa, both of Okazaki, all of Japan

[73] Assignee: Nippon Soken, Inc., Nishio, Japan

[21] Appl. No.: 58,438

[22] Filed: Jul. 18, 1979

[30] Foreign Application Priority Data

Aug. 25, 1978 [JP] Japan .................. 53/116837[U]

[51] Int. Cl.³ .................. F01B 29/08; B60R 21/10; F02N 13/00
[52] U.S. Cl. .................. 60/635; 60/632; 60/638; 180/628; 244/122 AG; 280/806; 280/802; 280/805
[58] Field of Search .................. 60/635, 637, 638, 632, 60/633, 639, 634, 636; 180/82 C; 280/744, 745, 746; 244/122 AG, 122 B

[56] References Cited

U.S. PATENT DOCUMENTS

| | | | |
|---|---|---|---|
| 2,815,008 | 12/1957 | Hirt | 60/638 |
| 3,071,404 | 1/1963 | Van Hove | 60/635 X |
| 3,111,808 | 11/1963 | Fritz | 60/635 |
| 3,234,727 | 2/1966 | Filer | 60/632 |
| 3,837,671 | 9/1974 | Hamilton | 60/632 X |
| 3,871,470 | 3/1975 | Schwanz et al. | 180/82 C |
| 3,892,073 | 7/1975 | Plantif et al. | 60/635 |
| 3,896,621 | 7/1975 | Sawyer | 60/635 |
| 4,008,780 | 2/1977 | Bendler et al. | 180/82 C |
| 4,091,621 | 5/1978 | Patrichi | 60/635 |

*Primary Examiner*—Wendell E. Burns
*Attorney, Agent, or Firm*—Cushman, Darby & Cushman

[57] ABSTRACT

A piston return stop device for seat belt tensioning equipment. Connected at one end to a seat belt through a cylinder is a piston having a tapered portion the diameter of which enlarges toward its other end. A cylindrical sliding member is slidably disposed between the cylinder and piston so as to slide together with the piston when the piston is thrust to tension the seat belt. A respective stopper member is slidably disposed within each guide groove radially perforated through the cylindrical sliding member and supported by the tapered portion of the piston.

When the piston is thrust through the cylinder at an urgent time until the tension force of the seat belt reaches a predetermined value, the piston is stopped from moving within the cylinder furthermore and only the cylindrical sliding member slides within the cylinder due to its inertia force together with the stopper members. Then the stopper member is pushed up by the tapered portion of the piston to cut into the inner wall of the piston. As a result, the return of the piston is certainly and safely stopped.

4 Claims, 3 Drawing Figures

PISTON RETURN STOP DEVICE FOR SEAT BELT TENSIONING DEVICE

RELATED APPLICATIONS

Reference is made to our related copending application Ser. No. 37,125 filed May 8, 1979 and to the related copending application Ser. No. 45,921 filed by us and another on June 6, 1979 and to our priority document referenced in the attached Declaration the contents of all of which are hereby incorporated hereinto by reference.

PREAMBLE

The present invention relates to a piston return stop device for a seat belt tensioning device which comprises a piston disposed within a cylinder and connected to the seat belt for a vehicle. The seat belt tensioning device restrains an occupant by the seat belt which is tensioned according to the travel of the piston within the cylinder at an urgent time such as upon an impact of the vehicle. By the device of the present invention, the return of the piston connected to the seat belt can be effectively stopped after the seat belt is tensioned by a predetermined tension force due to the travel of the piston.

One typical device of the conventional devices for stopping the return of a piston connected to a seat belt in a seat belt tensioning device includes a plurality of steel balls, or stopper pieces such as ring pieces having a sharp end, which are annularly accommodated in a wedge-shaped space formed between an inner wall of a cylinder and grooves formed in an outer periphery of the piston.

In this device, when the moving force of the piston as caused by a piston operating means becomes equal to the tension force of the seat belt and the piston consequently stops its movement, each of a plurality of steel balls or stopper pieces moves to a narrow portion of the wedge-shaped space due to its inertia force and cuts into the inner wall of the cylinder. As a result, the piston is prevented from being returned within the cylinder.

However, in the above described device, since the weight of each stopper piece is very light and hence the inertia force thereof is small, each of stopper pieces may not necessarily cut sufficiently into the cylinder so that the piston may not be completely prevented from being returned by this device.

In order to overcome the above described defect, the cylinder has been made of such a material as to be easily deformed by the stopper pieces having a small inertia force.

However, such a cylinder as described above is small in its strength and is easily damaged. Also, due to the difference in the inertia forces of a plurality of stopper pieces and the frictional forces thereof generated when the stopper pieces are thrust within the wedge-shaped space, the stopper pieces may not all cut uniformly into the cylinder.

Therefore, the tension load of the seat belt may be locally concentrated to just some of the stopper pieces which cut into the cylinder so that the cylinder is easily damaged.

Accordingly, an object of the present invention is to provide a piston return stop device for a seat belt tensioning device which maintains the tension force of a seat belt applied to an occupant at an urgent time such as upon an impact of a vehicle.

Another object of the present invention is to provide a piston return stop device for a seat belt tensioning device which prevents the return of the piston connected to a seat belt certainly after the seat belt is tensioned by a predetermined tension force due to the travel of the piston.

Still another object of the present invention is to provide a safe piston return stop device for a seat belt tensioning device which prevents the return of the piston connected to a seat belt without damaging the cylinder.

Other objects and advantages of the invention will become apparent from the following description of embodiments with reference to the accompanying drawings wherein.

Figure 1:
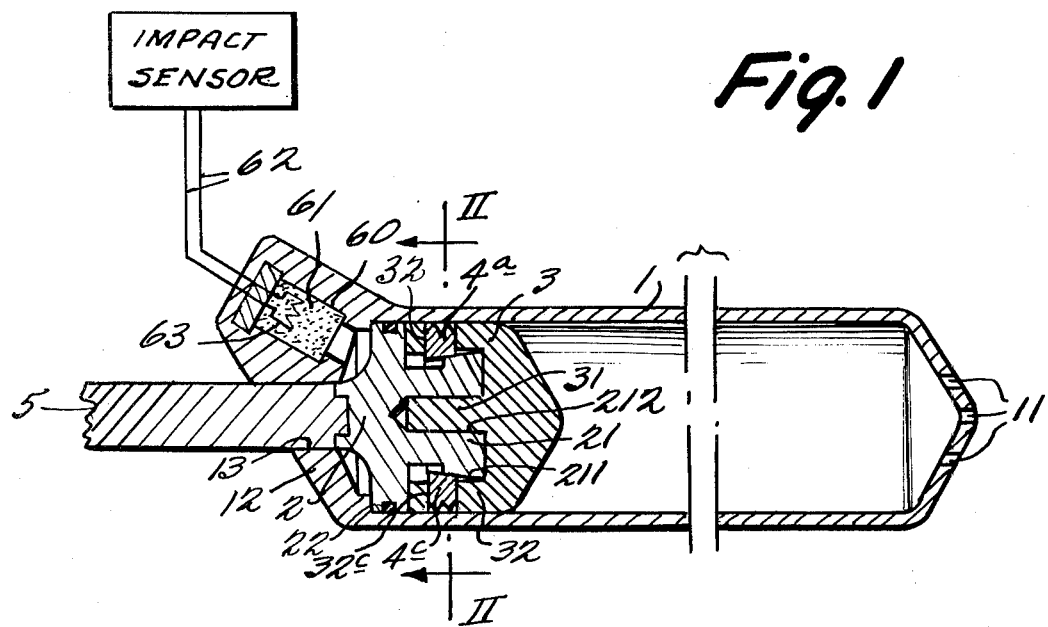
FIG. 1 is a longitudinal section of one embodiment of the present invention.
Figure 2:
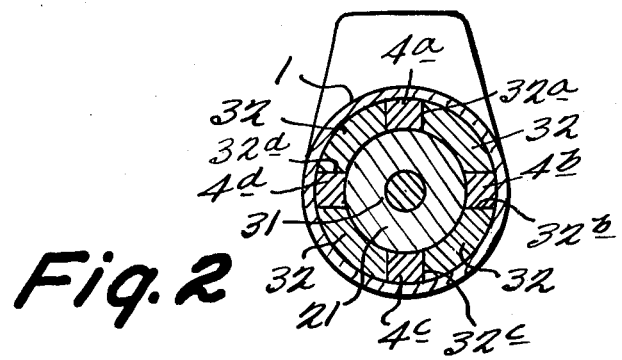
FIG. 2 is a cross sectional view of one embodiment of the present invention taken along a line II—II of FIG. 1.

According to the device of the present invention, a cylindrical sliding member is disposed within a cylinder so as to be slid relative to a tapered portion integrally formed in a piston. Within the cylindrical sliding member, stopper pieces are accommodated. When the piston is thrust in the cylinder at an urgent time until the tension force of the seat belt reaches a predetermined value, the piston is stopped from moving within the cylinder but the cylindrical sliding member moves together with each of the stopper pieces due to its inertia force so that each stopper piece certainly cuts into an inner wall of the cylinder because it is pushed outwardly by the tapered portion. As a result, the return of the piston is completely prevented.

Explaining the structure of the device of the present invention in more detail, a tapered portion is formed in the head side of the piston so as to be projected therefrom and the seat belt is connected with the piston via the other side thereof. The tapered portion has a conical peripheral surface the diameter of which enlarges toward the end opposite the seat belt connection to a radial length slightly short of the inner wall of the cylinder.

The cylindrical sliding member is provided with a plurality of guide grooves radially perforated therethrough and each stopper piece is slidably disposed within the guide groove. Each stopper piece also has an inclined inner surface supported by the conical peripheral surface of the piston and at least one sharp end portion for contacting the inner wall of the cylinder.

When the piston is thrust at an urgent time until the tension force of the seat belt reaches a predetermined value, the piston is stopped from moving within the cylinder and only the cylindrical sliding member slides together with the stopper pieces. At this time, each of stopper pieces is pushed outward by the conical peripheral surface of the tapered portion of the piston to certainly and quickly cut into the inner wall of the cylinder. As a result, the piston is completely prevented from being returned within the cylinder.

DETAILED DESCRIPTION

Hereinafter, one embodiment of the present invention is explained with reference to the drawings.

In a bottom wall or rear end portion 12 of a cylinder 1 is a powder chamber 60 which is communicated with the inside of the cylinder. In the opposed wall or nose-shaped front end portion of cylinder 1 are a plurality of holes 11 for letting air out of the cylinder.

A rod 5 is slidably inserted in a through hole 13 of the bottom wall 12, and piston 2 which is slidably disposed within cylinder 1 is connected with the internal end of rod 5. The other or outer end of rod 5 is connected with a seat belt (not shown) outside of cylinder 1. An O ring 22 is provided in the outer periphery of piston 2 for maintaining an airtight condition.

Integrally formed on the head or forward side of piston 2 and projecting forwardly from a central portion thereof is an annular tapered portion 21 of reduced diameter and containing a central hole 212. The outer peripheral surface 211 of tapered portion 21 has a conical shape the diameter of which enlarges toward the front end portion thereof. A cylindrical sliding member or cap 3 with a nose-shaped front end is closely disposed between the inner wall of the cylinder 1 and the tapered portion 21 of piston 2.

A columnar, rearwardly projecting portion 31 is centrally formed in the rear side of cylindrical sliding member 3, and an annular cylindrical portion 32 is integrally formed in the outer periphery thereof so as to project rearwardly therefrom the same distance as column 31. Column 31 and annulus 32 are slidably inserted respectively in the central hole 212 and the space formed between the outer peripheral conical surface 211 of tapered portion 21 and the inner wall of the cylinder.

Guide grooves 32a, 32b, 32c and 32d are radially perforated in annulus 32 at spaced circumferential positions such as every 90° as shown. Stopper pieces 4a, 4b, 4c and 4d are accommodated in the guide grooves, respectively, so as to be movable in the radial directions. The radially inner surface of each of stopper pieces 4a, 4b, 4c and 4d is inclined to fit the conical peripheral surface 211 of the tapered portion 21 and is supported by that conical surface 211.

The radially outer end of each of stopper pieces 4a, 4b, 4c and 4d is formed into two sharp tooth-like end portions 4' which are slidably in contact with the inner wall of cylinder 1.

The stopper pieces 4a, 4b, 4c and 4d are made of a material having high hardness and high strength such as a heat-treated tool steel, and the cylinder is made of a material having high strength which is not easily deformed, such as a machine structural carbon steel.

A piston operating means for moving the piston 2 comprises a propellent 61 charged within the powder chamber 60, a lead wire 62 connected to an impact sensor (not shown) and an ignition filament 63 disposed within the powder chamber 60 and connected to lead wire 62.

In the seat belt tensioning device provided with the piston return stop device having the above described structures, upon an impact of a vehicle, electric signals generated in the impact sensor are passed through lead wire 62 and the ignition filament 63 is heated to explode propellant 61. Then, plenty of gas is produced. Due to the high pressure of the gas, piston 2 is thrust together with the cylindrical sliding member 3 (forwardly to the right in FIGS. 1 and 3) to tension the seat belt connected with the piston 2 through rod 5. As a result, the occupant is restrained on his seat.

Since the outer peripheral surface of the piston 2 is made airtight relative to the inner wall of the cylinder 1 by means of the O ring 22, the high gas pressure does not affect the cylindrical sliding member 3 when the piston 2 is moved within the cylinder 1. Further, since the shock waves generated by the explosion of propellant 61 are absorbed by piston 2, the cylindrical sliding member 3 is moved forward without separation from piston 2.

Figure 3:
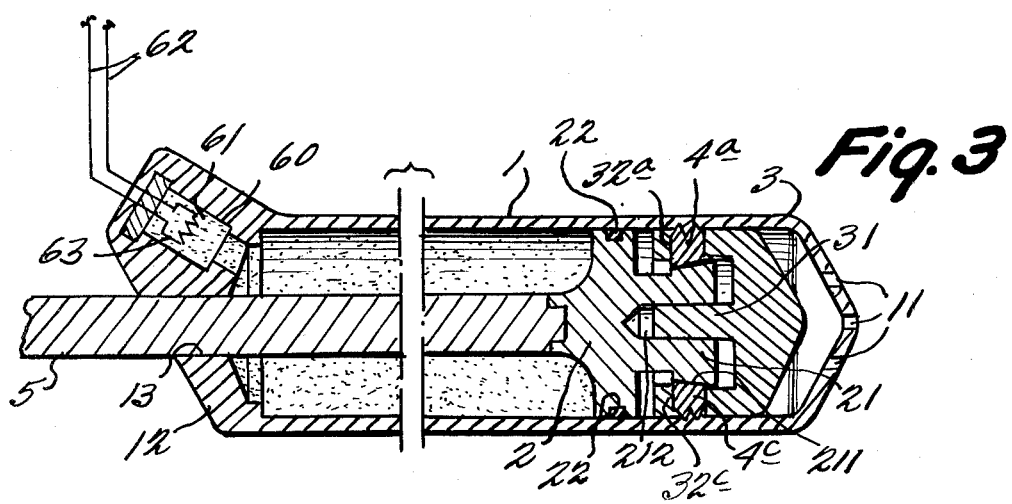
FIG. 3 is a longitudinal section of one embodiment under operation.

When piston 2 is moved to the point where the gas pressure within the cylinder 1 and the tension load of the seat belt applied to the occupant are balanced, the piston is stopped from further movement within cylinder 1, but the cylindrical sliding member 3 moves further to the right in FIG. 3 due to its inertia force. Stopper pieces 4a, 4b, 4c and 4d which are moved together with the cylindrical sliding member 3 are pushed radially outwardly by the conical peripheral surface 211 of the tapered portion 21 and the sharp end portion 4' thereof cut into the inner wall of the cylinder 1. At the same time, tension force is normally being applied then by the occupant via the seat belt to the piston 2 in the direction reverse to the thrust direction of the piston. By this tension force, stopper pieces 4a, 4b, 4c and 4d are more strongly cut into the inner wall of cylinder 1 and the conical peripheral surface 211 of the tapered portion 21 is locked by the inclined bottom surface of each of stopper pieces 4a, 4b, 4c and 4d. As a result, the return movement (to the left) of the piston 2 is completely prevented.

Since cylinder 1 is made of a material having high strength which is difficult to be deformed, only the sharp end portions of each of the stopper pieces cut into the inner wall of the cylinder. Therefore, the stopper pieces cannot move radially sufficiently to leave the end portion of the conical peripheral surface 211 of the tapered portion 21 but are securely wedged by that surface so the cylindrical sliding member 3 cannot move further to the right either.

In the above described embodiment, stopper pieces having two sharp end portions are used. Instead of such stopper pieces, stopper pieces having one, three or more sharp end portions can be used. Additionally, piston 2 can be directly connected with the seat belt without using a rod 5. Furthermore, instead of the propellant, a high pressure gas supplying device comprising a high pressure gas cylinder and a gas releasing mechanism and other means can be used as a piston operating means.

As described above, in the piston return stop device for the seat belt tensioning device of the present invention, a plurality of stopper pieces are accommodated in the cylindrical sliding member which is slidably inserted relative to the piston to be moved therewith. Due to a large inertia force applied to the cylindrical sliding member, each of stopper pieces uniformly and strongly cut into the inner wall of the cylinder. As a result, the return movement of the piston is prevented with certainty. Further, since each stopper piece cuts into the inner wall of the cylinder due to a large inertial force, the cylinder can be made of a material having high strength to increase the safety of the device. Still further, since each of the stopper pieces uniformly cuts into the inner wall of the cylinder as compared with the conventional device, the tension load of the seat belt is uniformly distributed to each of the stopper pieces without being concentrated to just some thereof, and hence the cylinder is not broken thereby. Therefore, the safety of the device is more certainly obtained.

Having now fully described the invention, it will be apparent to one of ordinary skill in the art that many changes and modifications can be made thereto without departing from the spirit or scope of the invention as set forth herein.

What is claimed is:

1. A seat belt tensioning device comprising:
   cylinder means having an inner wall,
   a piston slidably disposed within said cylinder means and having a longitudinally extended tapered portion with a diameter enlarging in the direction of its extended end and extending radially to a length short of said inner wall, said piston further having at its other end means for connecting the piston to a seat belt,
   a cylindrical sliding member slidably disposed between said cylinder means and said tapered portion of said piston so as to be slid together with said piston in said direction, said member having a plurality of circumferentially spaced guide grooves radially perforated through itself,
   a plurality of stopper members slidably disposed respectively within said guide grooves and having an inclined inner surface supported by said tapered portion of said piston and further having at least one sharp end portion for contacting the said inner wall of said cylinder means, and
   a piston operating means for making said piston slide within said cylinder.

2. A device as in claim 1, wherein:
   said tapered portion has a central hole opening toward said extended end, and
   said cylindrical sliding member is of a cap shape having a cylindrical portion in its outer periphery and is integrally provided with a projecting portion slidably disposed in said central hole of said tapered portion.

3. A device as in claim 1, wherein:
   said piston operating means comprises a powder chamber attached to an outer wall of said cylinder and communicated with an inside of said cylinder, a propellant charged within said powder chamber, an ignition filament embedded in said propellant and lead wires for electrically connecting said ignition filament to an impact sensor.

4. A device as in claim 1, wherein said seat belt connecting means includes a rod extending through said cylinder means for connecting to a seat belt outside of said cylinder means.

* * * * *